United States Patent Office 3,547,774
Patented Dec. 15, 1970

3,547,774
PROCESS FOR FORMING A SOLUBILIZED STILBENE DYE AND A PROCESS FOR FORMING COLORED PAPER THEREWITH
Robert Wallibald Johann Rebhahn and Derek William Bannister, Toms River, N.J., assignors to Toms River Chemical Corporation, Toms River, N.J., a corporation of Delaware
No Drawing. Filed June 30, 1967, Ser. No. 650,240
Int. Cl. D21h 3/80; C07c 143/52; C09b 27/02
U.S. Cl. 162—162                    3 Claims

ABSTRACT OF THE DISCLOSURE

An improved process is provided for the preparation of stilbene dyes of the family derived from the condensation of 2-methyl-5-nitrobenzene-sulfonic acid. The dyestuff obtained by the self-condensation of 2-methyl-5-nitrobenzene-sulfonic acid in the presence of lithium hydroxide as the strong alkali has been found to be very soluble in water and, hence, provides directly a solution of the dyestuff in water, eliminating the need for isolation of the dye and preparation of aqueous dispersions employing a surface active material. The solutions are particularly adapted for use in the manufacture of colored paper.

BACKGROUND OF THE INVENTION

It is desirable in the manufacture of colored paper that the dyestuff be employed in solution form so that it can be metered into the stream of paper pulp immediately before the formation of paper on the web. This requires that the dyestuff employed be rapidly and completely soluble in aqueous media in order that no undissolved particles remain to give a spotty appearance to the finished paper. It is further desirable that the dyestuffs be employed in solution form since the use of powdered dyestuffs frequently gives rise to dust particles which may contaminate the finished paper.

The liquid form in which the dyestuffs are desirably employed can be either solutions or suspensions in water or water miscible solvents. For economic and operational reasons water is the preferred medium.

One of the dyestuffs widely employed in the coloration of paper is Direct Yellow 11, C.I. 40,000 (Colour Index, vol 3, Page 3335). This dyestuff is one of the family of stilbene dyes prepared by the condensation of 2-methyl-5-nitrobenzene-sulfonic acid in the presence of sodium hydroxide. However, it is desirable to provide this dyestuff and associated members of this same family in a liquid form which is readily soluble in water and by means of a process which does not require the separation of the dyestuff after its formation.

SUMMARY OF THE INVENTION

The present invention relates to and has for its object the provision of a novel process for effecting the self-condensation of 2-methyl-5-nitrobenzene-sulfonic acid in the presence of lithium hydroxide, employing 2-methyl-5-nitrobenzene-sulfonic acid which contains no more than 3% sulfuric acid and using the reactants in approximately three times the concentration normally employed in the preparation of members of this family of stilbene dyes.

DESCRIPTION OF THE PREFERRED EMBODIMENT

The stilbene dyes are mixtures of dyes of indeterminate constitution obtained from the condensation of 2-methyl-5-nitrobenzene-sulfonic acid in aqueous sodium hydroxide medium, either alone or together with another aromatic compound, most generally an arylamine. The constitution of these dyestuffs are not known.

In the process of the present invention 2-methyl-5-nitrobenzene-sulfonic acid containing no more than 3% sulfuric acid is subjected to self-condensation in aqueous lithium hydroxide solution at a temperature within the range of about 40° to 100° C. The process is carried out employing the reactants in approximately three times the concentration conventionally employed in the preparation of stilbene dyes such as Direct Yellow 11 (C.I. 40,000). The process is usually complete in from about 4 to 8 hours. The dyestuff is obtained in the form of a liquid consisting of a saturated solution containing solid dyestuff and as such can be employed directly after the condensation reaction has taken place. No purification, filtration or drying of the dyestuff is necessary.

EXAMPLE 1

A one liter reaction vessel is charged with 100 g. of water and with 150 g. of 2-methyl-5-nitrobenzene-sulfonic acid containing 2% sulfuric acid. The resulting mixture is heated to 55° C. and adjusted to a pH of 7.5 with 32 g. of lithium hydroxide. As soon as the solution of the 2-methyl-5-nitrobenzene-sulfonic acid is complete there is added a further quantity of 30 g. of lithium hydroxide monohydrate over a period of 20 minutes. The reaction mixture is maintained at 55° C. for a period of 8 hours at a pH value in the range of 11.7 to 11.9.

At the end of the 8 hour period the volume of the reaction mixture is adjusted with water to 600 ml. and stirred for a period of 12 hours. At the expiration of the 12 hour period the pH of the reaction mixture is adjusted to 8.0 employing 27.6 g. of 96% sulfuric acid. The reaction mixture is then adjusted to a volume of 625 ml. and employed directly in the coloring of paper according to the procedure set forth in Example 2.

EXAMPLE 2

5 parts of bleached sulfite pulp are immersed in 200 ml. of water at room temperature and the pulp suspension agitated until the pulp is thoroughly dispersed. 1 ml. of 5% rosin solution is then added and the resulting mixture agitated for 10 minutes. An amount of the dye solution of Example 1 sufficient to provide a concentration of 2.0% dye on the weight of the dry bleached sulfite pulp is added and the suspension again agitated for 10 minutes. 3 ml. of 5% aluminum sulfate solution are then added, the suspension agitated for 10 minutes and sheets then prepared in a hard-sheet mold. The sheets with blotters are pressed in a William Standard Pulp Press at a pressure of 1,000 pounds for a period of 80 seconds. The sheets are then removed with blotters and dried.

The above procedure is repeated employing an amount of dyestuff solution from Example 1 sufficient to provide a concentration of 0.4% of dyestuff on the weight of the dry bleached sulfite pulp.

In each instance colored paper of satisfactory yellow shade is obtained.

We claim:
1. A process for the preparation of a solubilized stilbene dye which comprises heating 2-methyl-5-nitrobenzene-sulfonic acid in aqueous medium at a temperature of about 40° to about 100° C. and in the presence of at least a stoichiometric amount of lithium hydroxide; said 2-methyl - 5 - nitrobenzene-sulfonic acid contains no more than 3% by weight of sulfuric acid.

2. A process according to claim 1 in which the lithium hydroxide is added incrementally.

3. A process for the preparation of colored paper which comprises heating 2-methyl-5-nitrobenzene-sulfonic acid in aqueous medium at a temperature of about 40° to about 100° C. in the presence of at least a stoichiometric amount of lithium hydroxide; said 2-methyl-5-nitrobenzene sulfonic acid contains no more than 3% by weight of sulfuric acid, adding the resulting dyestuff solution to a suspension of paper pulp and forming the paper.

References Cited

UNITED STATES PATENTS

| | | | |
|---|---|---|---|
| 2,812,322 | 11/1957 | Conn et al. | 260—143 |
| 2,821,550 | 1/1958 | Strobel | 260—505 |
| 3,128,222 | 4/1964 | Herschler et al. | 162—162 |

OTHER REFERENCES

The Synthetic Dyestuffs; Cain and Thorpe, 1913, pp. 47–48.

S. LEON BASHOVE, Primary Examiner

F. FREI, Assistant Examiner

U.S. Cl. X.R.

8—7; 162—126; 260—143, 205, 206, 505, 507

Notice of Adverse Decision in Interference

In Interference No. 98,132, involving Patent No. 3,547,774, R. W. J. Rebhahn and D. W. Bannister, PROCESS FOR FORMING A SOLUBILIZED STILBENE DYE AND A PROCESS FOR FORMING COLORED PAPER THEREWITH, final judgment adverse to the patentees was rendered Aug. 15, 1974, as to claims 1, 2 and 3.

[*Official Gazette December 24, 1974.*]